United States Patent [19]

McNeal

[11] Patent Number: 5,125,612
[45] Date of Patent: Jun. 30, 1992

[54] VIDEO SCREEN BRACKET

[76] Inventor: David R. McNeal, 3575 Robindale Dr., Winston-Salem, N.C. 27107

[21] Appl. No.: 743,804

[22] Filed: Aug. 12, 1991

[51] Int. Cl.⁵ ............................................. B41J 11/02
[52] U.S. Cl. .............................. 248/442.2; 248/447.1; 248/918; 312/7.2
[58] Field of Search ............... 248/442.2, 918, 454, 248/447.2, 447.1; 312/233, 7.2; 211/45; 400/718, 718.1, 718.2

[56] References Cited

U.S. PATENT DOCUMENTS

| | | | |
|---|---|---|---|
| 794,099 | 7/1905 | Heaney | 248/442.2 |
| 1,037,292 | 9/1912 | Morden | 281/27.1 X |
| 1,590,551 | 6/1926 | Reese | 248/442.2 |
| 3,576,690 | 4/1971 | Staats | 281/27.1 X |
| 4,475,705 | 10/1984 | Henneberg | 248/447.2 |
| 4,632,471 | 12/1986 | Visnapuu | 312/233 |
| 4,767,093 | 8/1988 | Jones | 248/442.2 |
| 4,902,078 | 2/1990 | Judd | 312/7.2 |
| 4,960,257 | 10/1990 | Waters | 248/454 X |
| 5,035,392 | 7/1991 | Gross | 248/918 X |
| 5,044,593 | 9/1991 | Jones | 248/918 X |

Primary Examiner—J. Franklin Foss

[57] ABSTRACT

A bracket for a video screen is affixed thereto and holds worksheets for the terminal operator. The bracket includes a pair of ring-like components which pass through apertures in the worksheets to allow the operator to flip the worksheets over the laterally extending boom after use. An adjustable sheet support depends from the boom permits the operator to correctly bias the sheet which is being read for comfort and to prevent eyestrain.

16 Claims, 2 Drawing Sheets

VIDEO SCREEN BRACKET

BACKGROUND OF THE INVENTION

1. Field of the Invention

The present invention pertains to brackets for maintaining worksheets in a convenient, orderly fashion and particularly for brackets which are attached to video screens of computer terminals.

2. Description of the Prior Art and Objectives of the Invention

In recent years it has become increasingly popular for many businesses to utilize a single main-frame computer and a large number of terminals or work stations for individual operators. Each operator is provided with a video screen and a keyboard. Data entry is commonly performed from loose-leaf worksheets which are usually placed on an adjoining desk, stand or bracket attached to the video screen. Conventional attached brackets do not allow the operator to "flip over" the sheets as they are being used but instead the operator must remove each sheet from a spring loaded clamp which engages the worksheets. Also, such conventional brackets allow the paper to hang vertically downwardly and are not positioned in a slanted manner for the purposes of better viewing. Also, conventional video screen brackets can easily become disattached from the video screen during use and must be reattached often.

With the known disadvantages and problems of prior art video screen brackets, the present invention was conceived and one of its objectives is to provide a video screen bracket which can be securely attached to a video screen of a terminal or lap top computer and which will remain in place after months or even years of constant daily use but can be easily removed and placed on another video screen if desired.

It is another objective of the present invention to provide a bracket for attachment to a video screen which includes a longitudinal member which includes a pair of L-shaped end components to secure the bracket along each side of the video screen.

It is still another objective of the present invention to provide a video screen bracket for holding worksheets which can be adjusted for various width video screens.

It is still another objective of the invention to provide a video screen bracket which includes a boom which is affixed to one of the L-shaped members to maintain the worksheets conveniently beside the video screen having ring-like configurations which are slidably positionable along the boom.

It is yet still another objective of the present invention to provide a video screen bracket which includes a worksheet support which can be adjusted to various angles for convenient viewing of the worksheets by the terminal operator.

Various other objectives and advantages of the present invention will become apparent to those skilled in art as the detailed presentation of the invention is set forth below.

SUMMARY OF THE INVENTION

The aforesaid and other objectives are realized by providing a video screen bracket which includes a longitudinal member consisting of a pair of L-shaped components which are adjustable and slidably engage along the top of the video screen. The L-shaped members include resilient pads for attaching each L-shaped component to opposite sides of the video screen. A hook and loop fastener such as sold under the trademark Velcro is used to affix the legs of the L-shaped member together along the top center of the video screen. Extending laterally from one of the L-shaped members is a bracket boom which includes a pair of slidable ring-like configurations which pass through openings in the worksheets to thereby suspend the worksheets therefrom. A worksheet support is releasably positioned in one of a plurality of slots along the bottom of the boom to bias the worksheets in accordance with the operator's preference. The video screen bracket may be formed from durable synthetic plastic materials or may be formed from lightweight metal as desired. The ring-like configurations allow the operator to flip each worksheet over after it has been used to make the underneath sheet available. The bracket can be placed for either right or left viewing of the video screen.

DESCRIPTION OF THE PREFERRED EMBODIMENT

The preferred form of the invention is shown in FIGS. 1-4 whereby a video screen bracket for maintaining a series of loose-leaf worksheets are supported on a boom extending from a slidable bracket. The boom is hingedly attached to one L-shaped component and of course the bracket can be reversed for boom extension laterally from the other side of the video screen. The L-shaped components are affixed to each other on top of the video screen by hook and loop fastener and each L-shaped component securely grasp the sides of the video screen. The boom comprises front and back longitudinal grooves into which resilient ring-like configurations are slidably maintained. A worksheet support is releasably inserted into one of a plurality of openings along the center of the bracket boom to bias the suspended paper at the operator's preference. The ring-like configurations include a flattened end to prevent the rings from pivoting as for example if they are slid along the bracket boom.

DETAILED DESCRIPTION OF THE DRAWINGS AND OPERATION OF THE INVENTION

Figure 1:
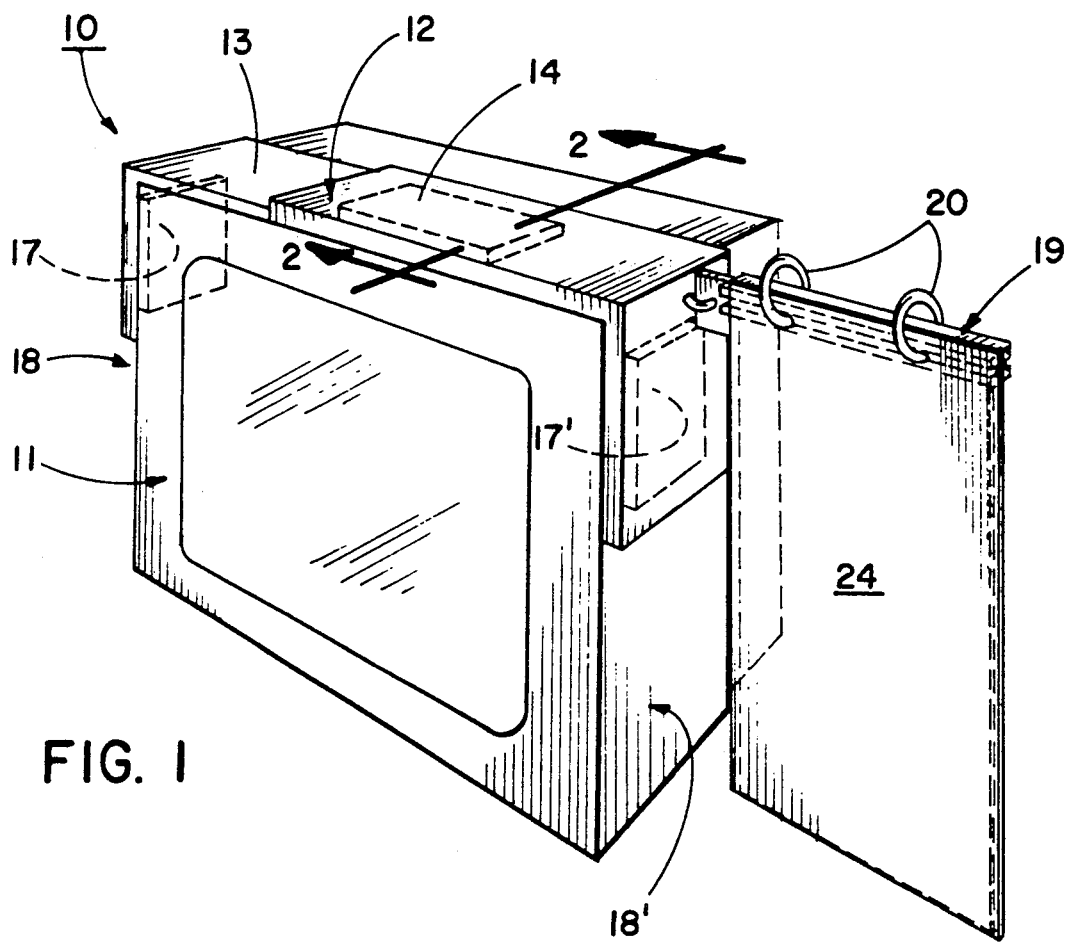
FIG. 1 shows a conventional terminal video screen with the bracket of the invention affixed thereto.
Figure 2:
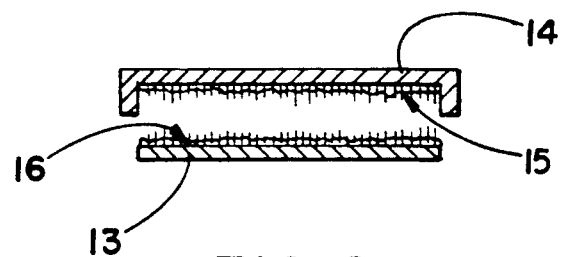
FIG. 2 demonstrates an exploded view of the longitudinal member of the bracket along lines 2—2 as seen FIG. 1.

For a more complete understanding of the invention and its operation, turning now to the drawings, video screen bracket 10 as shown in FIG. 1 is affixed to video screen 11 which may be a video screen for a computer terminal or the like. Bracket 10 comprises left L-shaped component 13 and right L-shaped component 14 which overlap to form longitudinal member 12. As seen in FIG. 2, left L-shaped component 13 slidably engages right L-shaped component 14 which has an inverted U-shaped cross section as seen along line 2—2 in FIG. 1. Hook material 15 as shown in FIG. 2 is attached to right L-shaped member 14 whereas loop material 16 is affixed to left L-shaped component 13. As bracket 10 is positioned on video screen 11, hook material 15 and loop material 16 engage to prevent left L-shaped component 13 and right L-shaped component 14 from moving relative to each other as the sides of video screen 11 are held therebetween. Also, resilient pads 17, 17' which may consist of a synthetic polymer material such as polyurethane, nylon or other resilient materials may have, under certain circumstances, a suitable adhesive 23 applied to both sides. Pads 17, 17' are adhesively adhered to the L-shaped brackets 13 and 14 and grasp sides 18, 18' of video screen 11 to secure it in place.

Figure 3:
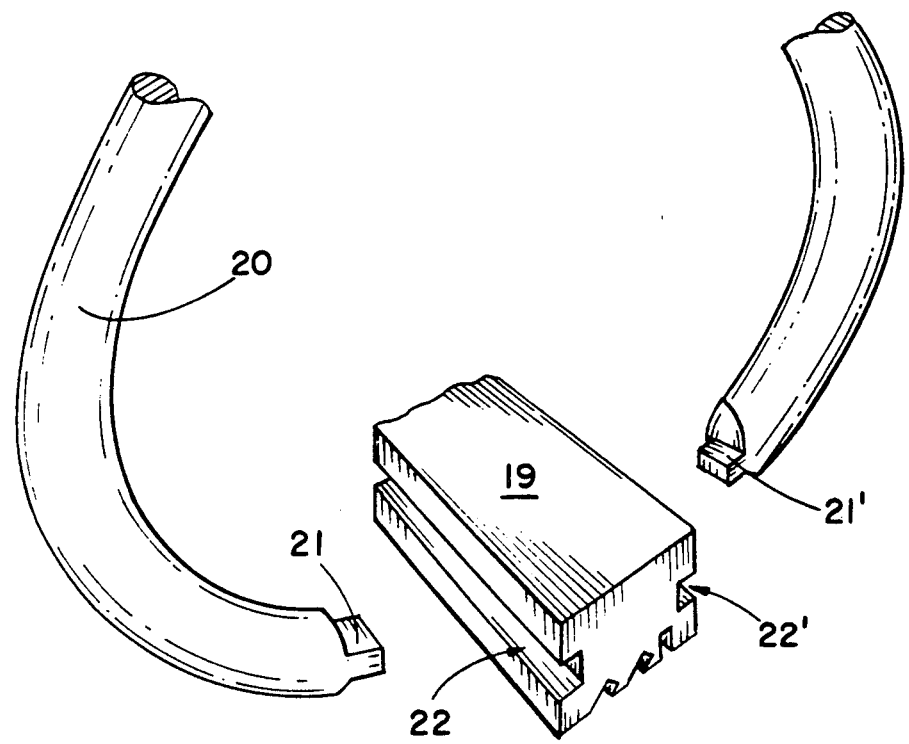
FIG. 3 pictures an enlarged view of one of the ring-like configurations opened and released from the bracket boom.

As further shown in FIG. 1, boom bracket 19 is hingedly affixed to right L-shaped component 14 and extends laterally away from video screen 11. Boom bracket 19 includes a pair of ring-like configurations 20 which, as shown in FIG. 3, include flattened end members 21, 21'. Ringlike configuration 20 may be formed of a suitable plastic having sufficient memory for releasable engagement in boom bracket grooves 22, 22'. Grooves 22, 22' are sized whereby ring configurations 20 can slide therealong to adjust for various "on center" spacings of apertures of worksheets 24. By reversing components 13 and 14, boom bracket 19 can be extended to the left of video screen 11.

Figure 4:
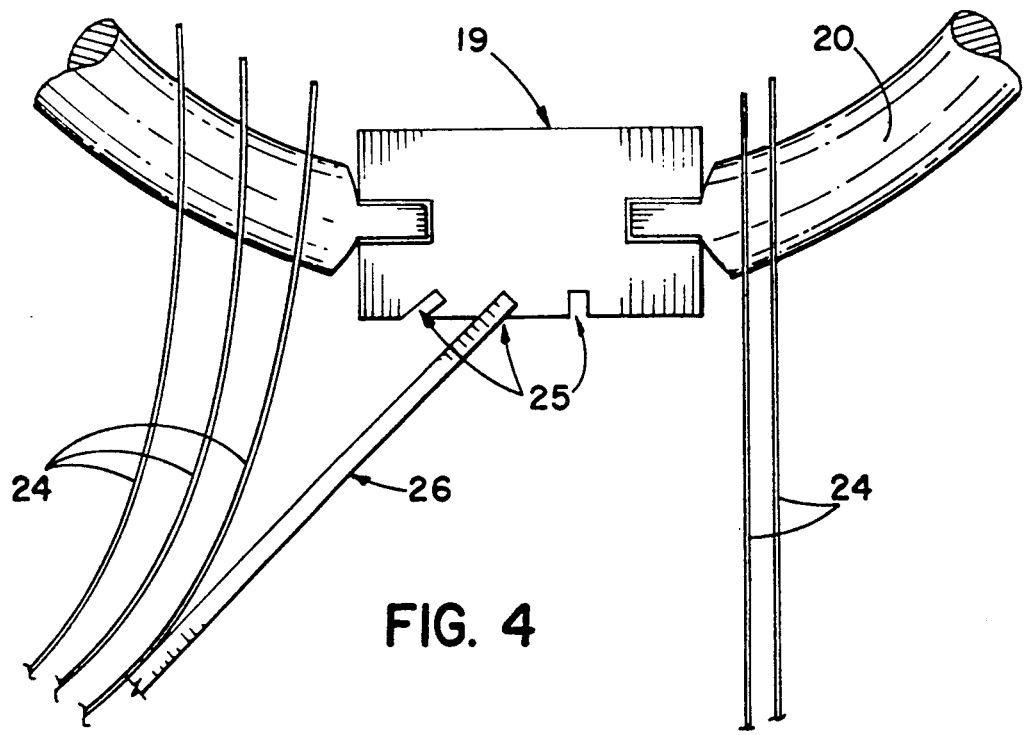
FIG. 4 illustrates an end view of the bracket boom with the worksheet support in position.

In FIG. 4, ring-like configuration 20 is shown in partial view with worksheets 24 thereon. A plurality of support openings 25 are seen in the approximate middle of the bottom of boom 19. Support slots 25 receive biasing worksheet support 26 to allow the user, by simply moving worksheet support 26 to the desired opening 25, to change the bias of worksheet 24 to meet his or her individual viewing preference. Worksheet support 26 consists of a substantially planar, fairly rigid member formed from suitable plastic or the like to allow worksheets 24 to rest thereon before they are flipped over, rearwardly along ring-like configurations 20. Ring-like configurations 20 pass through openings punched in worksheets 24 which may contain data or other information for reading by the terminal operator and present a means by which the worksheets 24 can be shifted from an "in use" to "finished use" by flipping over said boom 19.

The illustrations and descriptions contained herein are for explanatory purposes and are not intended to limit the scope of the appended claims.

I claim:

1. A bracket for conveniently maintaining work sheets proximate a video screen comprising: a longitudinal member, means to fasten said longitudinal member to said video screen, said attaching means affixed to said longitudinal member, a bracket boom, said boom affixed to said longitudinal member, said boom defining a pair of longitudinal grooves, means for shifting said work sheets over said boom as said work sheets are used, said shifting means comprising a ring-like configuration extending upwardly from, and slidably positioned on said boom within said boom grooves.

2. The bracket of claim 1 wherein said longitudinal member comprises a pair of L-shaped components, said L-shaped components adjustably engaging to securely attach to said video screen.

3. The bracket of claim 2 wherein said L-shaped components comprises hook and loop fasteners.

4. The bracket of claim 2 wherein said L-shaped components slidably engage.

5. The bracket of claim 2 wherein one of said pair of L-shaped components has an inverted U-shape.

6. The bracket of claim 1 wherein said attaching means comprises an adhesive.

7. The bracket of claim 1 wherein said attaching means comprises a resilient adhesive pad.

8. The bracket of claim 1 wherein said boom extends laterally from said video screen.

9. The bracket of claim 1 wherein said boom is pivotally attached to said longitudinal member.

10. The bracket of claim 1 wherein said shifting means straddles said boom.

11. The bracket of claim 10 wherein said shifting means is substantially cylindrically shaped and includes a pair of flattened ends.

12. The bracket of claim 1 wherein said shifting means comprises a pair of ring-like configurations, said ring-like configurations to accommodate said work sheets by allowing the sheets to flip over said boom.

13. A bracket for holding work sheets proximate a video screen comprising: an adjustable longitudinal member comprising a pair of slidably engaging L-shaped components, each of said components comprising a means to affix said components to said video screen, a boom, said boom attached to one of said L-shaped components and extending laterally from said video screen, said boom defining a pair of horizontal grooves, a means to shift work sheets over said boom, each of said shifting means comprising an openable ring-like cylindrical configuration, said ring-like configurations extending upwardly from said boom, said configurations having flattened, opposing ends, said ends for insertion into said boom grooves whereby said ring-like configurations can be slid along said boom for maintaining said work sheets and to allow said work sheets to be flipped over said boom after each of said work sheets is used.

14. The bracket of claim 13 wherein said L-shaped components comprise a hook and loop fastener.

15. The bracket of claim 13 and including means to bias said work sheets, said boom defining a slot, said biasing means positionable within said slot, and said biasing means comprising a planar, relatively rigid sheet.

16. The bracket of claim 15 wherein boom defines a plurality of slots for selectively receiving said biasing means.

* * * * *